(12) United States Patent
Nuttall et al.

(10) Patent No.: US 12,149,345 B2
(45) Date of Patent: Nov. 19, 2024

(54) ADAPTIVE SATELLITE WIRELESS COMMUNICATION PARAMETER SELECTIONS

(71) Applicant: Skylo Technologies, Inc., Palo Alto, CA (US)

(72) Inventors: Andrew Nuttall, Mountain View, CA (US); Meghna Agrawal, Cupertino, CA (US); Yihenew Dagne Beyene, Espoo (FI); Keijo Tapio Lehtinen, Espoo (FI); Vijay Lewis, Wylie, TX (US)

(73) Assignee: Skylo Technologies, Inc., Palo Alto, CA (US)

(*) Notice: Subject to any disclaimer, the term of this patent is extended or adjusted under 35 U.S.C. 154(b) by 368 days.

(21) Appl. No.: 17/712,149

(22) Filed: Apr. 3, 2022

(65) Prior Publication Data

US 2023/0318734 A1 Oct. 5, 2023

(51) Int. Cl.
*H04L 1/00* (2006.01)
*H04L 1/08* (2006.01)
*H04W 80/00* (2009.01)
*H04W 84/06* (2009.01)

(52) U.S. Cl.
CPC .............. *H04L 1/0003* (2013.01); *H04L 1/08* (2013.01); *H04W 80/00* (2013.01); *H04W 84/06* (2013.01)

(58) Field of Classification Search
CPC ....... H04L 1/0001; H04L 1/0003; H04L 1/00; H04L 1/08; H04L 1/003; H04W 84/00; H04W 84/02; H04W 84/04; H04W 84/06; H04W 52/262; H04W 4/00; H04W 4/30; H04W 80/00; H04W 88/08
See application file for complete search history.

(56) References Cited

U.S. PATENT DOCUMENTS

| | | | |
|---|---|---|---|
| 9,088,335 B2 | 7/2015 | Jong et al. | |
| 9,277,505 B2 | 3/2016 | Kin et al. | |
| 11,277,201 B1 | 3/2022 | Nuttall et al. | |
| 11,722,215 B1* | 8/2023 | Bhaskar | H04B 7/18513 370/316 |
| 2008/0004032 A1* | 1/2008 | Lironi | H04L 1/0017 455/67.11 |
| 2009/0258665 A1* | 10/2009 | Bourlas | H04L 1/0009 455/522 |
| 2009/0296628 A1 | 12/2009 | Karabinis | |

(Continued)

FOREIGN PATENT DOCUMENTS

WO WO-2023083431 A1 * 5/2023 ............... H04L 1/00

OTHER PUBLICATIONS

PCT International Search Report and Written Optinion; PCT/US 23/63732. Jul. 28, 2023.

*Primary Examiner* — Warner Wong
(74) *Attorney, Agent, or Firm* — Brian R. Short

(57) ABSTRACT

Apparatuses, methods, and systems for adaptive satellite wireless communication parameter selections are disclosed. One method includes predicting, by a base station, characteristics of a communication channel between the base station and a wireless hub, wherein a satellite is located within the communication channel between the base station and the wireless hub, and selecting, by the base station, wireless communication parameter selections including at least an MCS (modulation and coding scheme) based on the predicted characteristics of the communication channel.

21 Claims, 8 Drawing Sheets

(56) References Cited

U.S. PATENT DOCUMENTS

| | | | |
|---|---|---|---|
| 2010/0007743 A1* | 1/2010 | Kim | H04L 7/042 |
| | | | 348/194 |
| 2010/0240407 A1 | 9/2010 | Park et al. | |
| 2011/0143654 A1* | 6/2011 | Mukhija | H04B 7/18513 |
| | | | 455/9 |
| 2012/0224612 A1 | 9/2012 | Kim et al. | |
| 2013/0009809 A1* | 1/2013 | Bert | H04B 7/2041 |
| | | | 342/354 |
| 2013/0215985 A1* | 8/2013 | Lee | H04L 25/0202 |
| | | | 370/335 |
| 2014/0071838 A1* | 3/2014 | Jia | H04L 1/0033 |
| | | | 370/252 |
| 2014/0126345 A1* | 5/2014 | Ohana | H04L 1/0009 |
| | | | 375/222 |
| 2019/0349789 A1 | 11/2019 | Zeng et al. | |
| 2019/0353799 A1* | 11/2019 | Grant | B64G 3/00 |
| 2021/0091849 A1 | 3/2021 | Nuttall et al. | |
| 2021/0203410 A1* | 7/2021 | Khan | H04H 40/90 |
| 2022/0039026 A1* | 2/2022 | Sharma | H04W 52/283 |
| 2023/0239069 A1* | 7/2023 | Liu | H04L 1/0019 |
| | | | 370/252 |
| 2023/0275650 A1* | 8/2023 | Zhu | H04B 7/185 |
| | | | 370/316 |

* cited by examiner

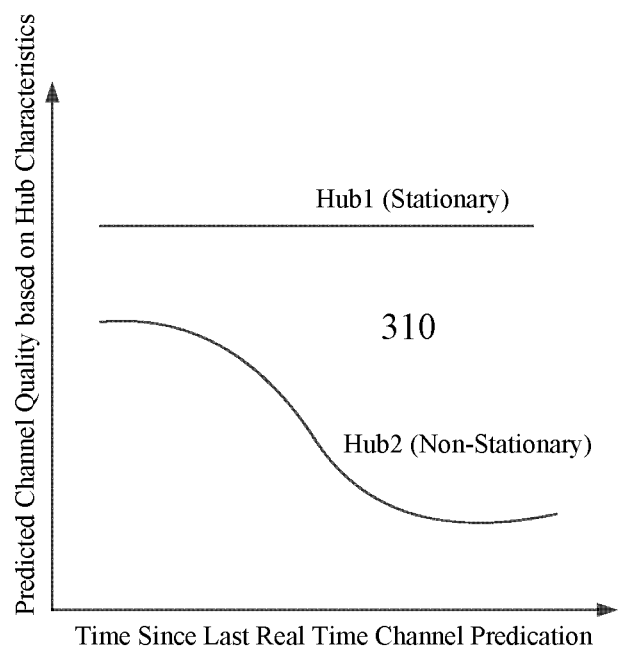
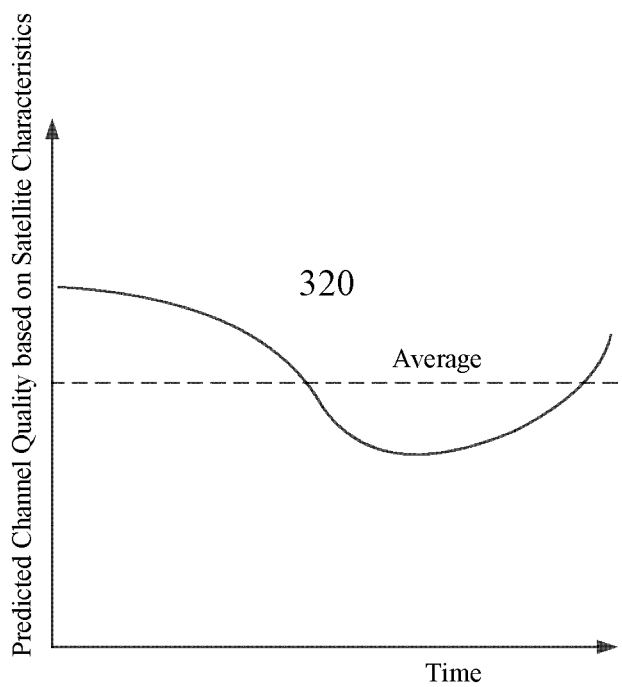
Figure 3

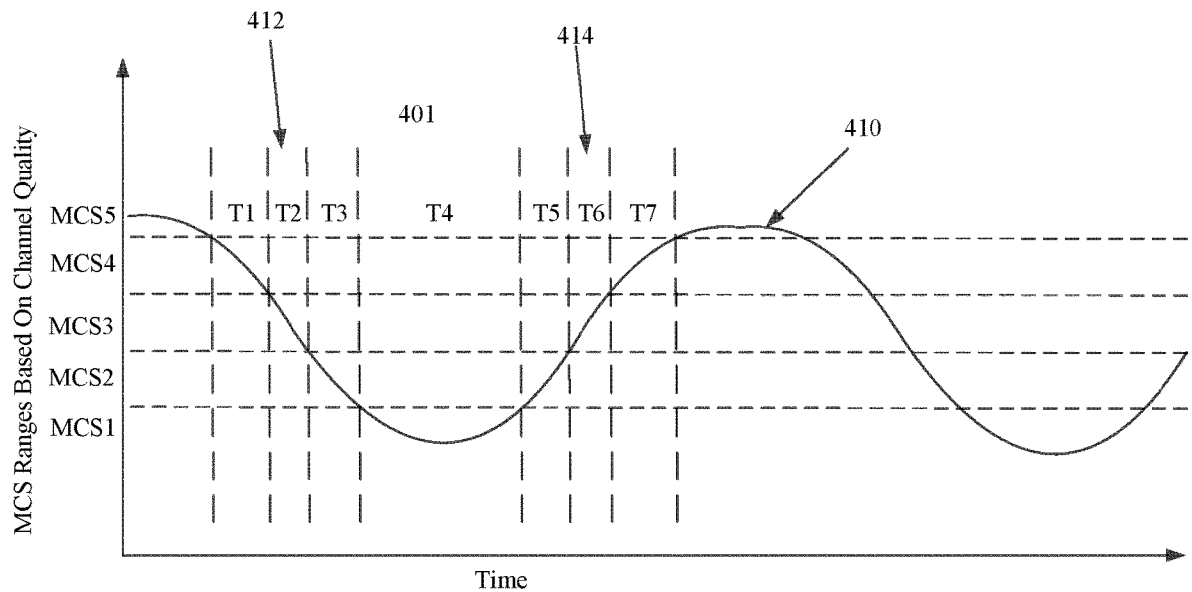
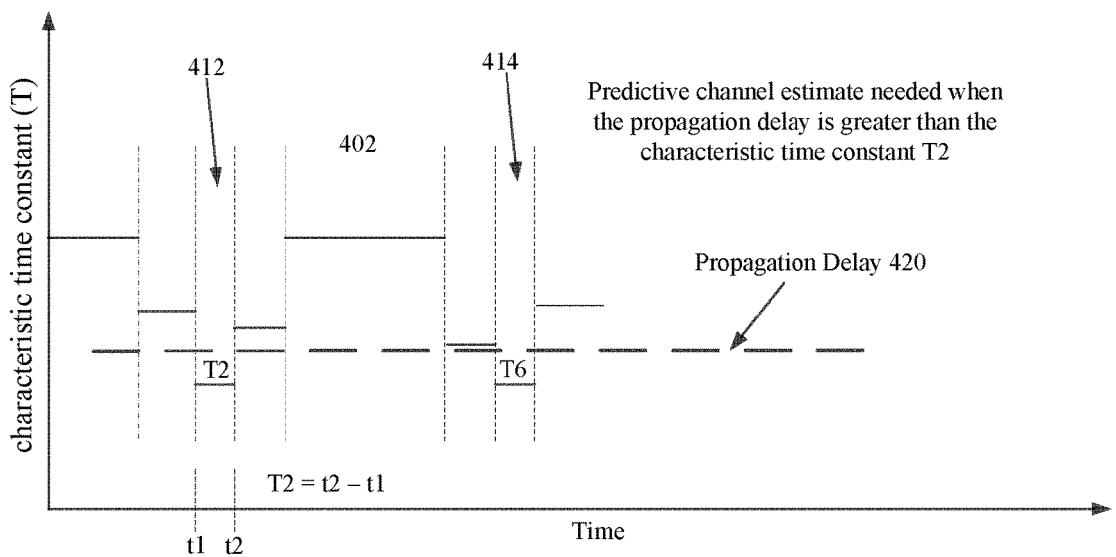
Figure 4

Predicting, by a base station, characteristics of a communication channel between a base station and a wireless hub, wherein a satellite is located in the communication channel between the base station and the wireless hub

610

Selecting, by the base station, wireless communication parameter selections including at least an MCS (modulation and coding scheme) based on the predicted characteristics of the communication channel

ADAPTIVE SATELLITE WIRELESS COMMUNICATION PARAMETER SELECTIONS

FIELD OF THE DESCRIBED EMBODIMENTS

The described embodiments relate generally to wireless communications. More particularly, the described embodiments relate to systems, methods, and apparatuses for adaptive satellite wireless communication parameter selections.

BACKGROUND

Current data networks are designed primarily for human users and the network and traffic characteristics that human users generate. The growth and proliferation of low-cost embedded wireless sensors and devices pose a new challenge of high volumes of low bandwidth devices vying for access to limited network resources. One of the primary challenges with these new traffic characteristics is the efficiency at which the shared network resources can be used. For common low bandwidth applications such as GPS tracking, the efficiency (useful/useless data ratio) can often be below 10%. This inefficiency is the result of large volumes of devices communicating in an uncoordinated environment. Addressing this problem is fundamental to the future commercial viability of large-scale sensor network deployments.

It is desirable to have methods, apparatuses, and systems for adaptive satellite wireless communication parameter selections.

SUMMARY

An embodiment includes a method of adaptive satellite wireless communication parameter selections. The method includes predicting, by a base station, characteristics of a communication channel between the base station and a wireless hub, wherein a satellite is located in the communication channel between the base station and the wireless hub, and selecting, by the base station, wireless communication parameter selections including at least an MCS (modulation and coding scheme) based on the predicted characteristics of the communication channel.

Another embodiment includes a satellite wireless communication system. The system includes a wireless hub and a base station. The base station is configured to predict characteristics of a communication channel between the base station and the wireless hub, wherein a satellite is located within the communication channel between the base station and the wireless hub and select wireless communication parameters including at least an MCS (modulation and coding scheme) based on the predicted characteristics of the communication channel.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 3 shows timelines of a predicted channel quality between hubs and a base station, according to an embodiment.

FIG. 4 shows a timeline of a channel quality, and a timeline of characteristic time constants of a channel, according to an embodiment.

FIG. 6 shows steps of a method of method of adaptive satellite wireless communication parameter selections, according to an embodiment.

DETAILED DESCRIPTION

The embodiments described include methods, apparatuses, and systems for adaptive selection of satellite wireless communication parameter. For an embodiment, the adaptive selections are predictive to account for changes in the channel over the time of a time delay of wireless communications between a base station and a wireless hub. For an embodiment, the adaptively selected of satellite wireless communication parameter are use in the selection of an MCS (modulation and coding scheme) and/or repetitions of downlink and uplink wireless communication between the base station and the wireless hub.

Figure 1:
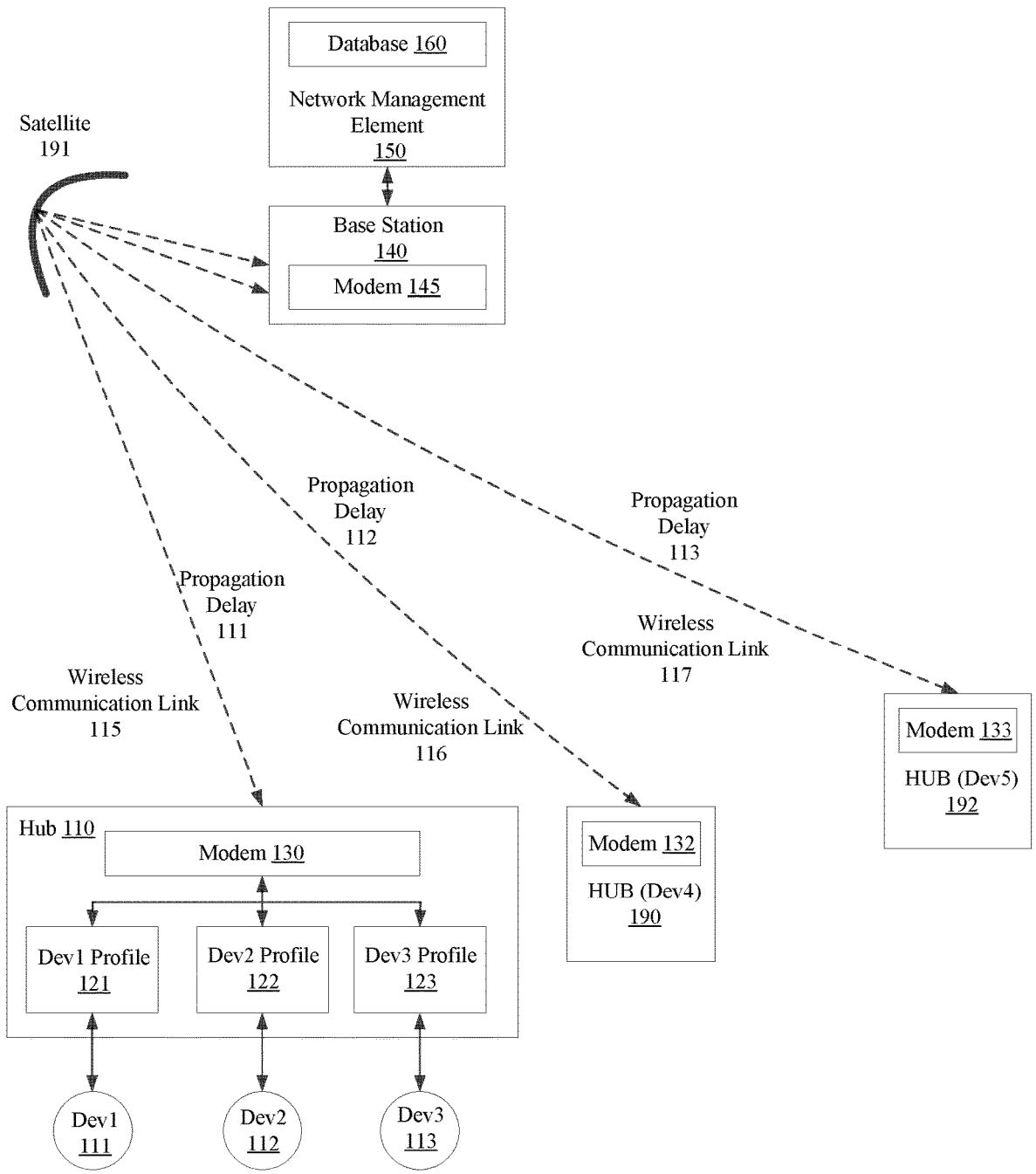
FIG. 1 shows a plurality of hubs that communicate data of data sources through a satellite link to a base station, according to an embodiment.

FIG. 1 shows a plurality of wireless hubs 110, 190, 192 that communicate data of data sources through a satellite link (through satellite 191) to a base station 140, according to an embodiment. For an embodiment, the wireless communication between the base station 140 and the plurality of hubs 110, 190 through wireless links 115, 116 is scheduled. For an embodiment, a database 160 of, for example, a network management element 150, aids in generating the scheduled communication. For an embodiment, the scheduled communication includes allocating preambles for random access channels, frequency, and time slots, for both uplink and downlink wireless communication. For an embodiment, the base station 140 includes a modem 145 and the hubs 110, 190, 192 include modems 130, 132, 133 for enabling the wireless communication between the base station 140 and the hubs 110, 190, 192 through satellite wireless links 115, 116, 117.

For satellite systems, the wireless links 115, 116, 117 can be very long. Accordingly, propagation delays 111, 112, 113 of wireless communication between the hubs 110, 190, 192 through the wireless communication links 115, 116, 117 and the base station 140 can be very long. Further, the propagation delay and the path loss can vary with time. Accordingly, the quality of the wireless communication links 115, 116, 117 can vary greatly, and vary over time due to motion of the satellite 191.

Satellite motion and a large cell size of satellite beams creates situations in which there are both a large mean RTT (round trip time) (~512 ms in GEO) and also a large variation of the RTT (~+−4 ms over 24 hrs in GEO). The long-term motion of a satellite is not indefinitely predictable and may even incur sudden changes in position from station keeping activities. For example, a satellite may maintain its orbital position by using onboard thrusters to keep its current stationed position. Due to these reasons, a UE (user equipment) or hub requires a live and dynamic means to independently determine the one-way delay (propagation delay) between itself and the base station. For an embodiment, RTT is computed as twice of estimated one-way (propagation) delay.

For at least some embodiments, the hubs 110, 190, 192 include any type of communication device which can include one more data sources that are either internal or external to the hubs. For example, the hubs may include a handset, a tracking device, or a monitoring device.

For an embodiment, a network server generates a data profile (or hub profile) (121, 122, 123) for the hubs 110, 190, 192. For an embodiment, the data profile (or hub profile) (121, 122, 123) for each of the hubs 110, 190 correspond with devices 111, 112, 113, which are connected to the hubs 110, 190, 191. It is to be noted that the hubs 190, 192 represents data sources Dev4, Dev5.

For an embodiment, the base station is configured to predict characteristics of a communication channel between the base station 140 and a wireless hub (such as, any one of hubs 110, 190, 192), wherein the satellite 191 is located within the communication channel between the base station 140 and the wireless hub. Further, the base station 140 is configured to select wireless communication parameters including at least an MCS (modulation and coding scheme) based on the predicted characteristics of the communication channel.

The described embodiments include an MCS selection. At least some of these described embodiments include a repetitions selection, wherein the repetition selection includes transmit diversity and determines how many times a packet is repeatedly transmitted. For an embodiment, the MCS selection includes the repetition selection. For an embodiment, the repetition selections are made independent of the MCS selection.

For an embodiment, the base station predicts the characteristics of the communication channel because the characteristics are constantly changing. Merely selecting the MCS based on present or current channel characteristics is not desirable because the channel characteristics will be different once used as compared to when selected, resulting in sub-optimal performance. Therefore, the characteristics are predicted for the communication channel some time difference from a present time.

As described, satellite systems have large propagation delays between the wireless hubs and the base station. For an embodiment, the base station selects the MCS for both downlink (from the base station to the hubs) and uplink (from the wireless hubs to the base station). Therefore, the base station communicates the MCS selections to each of the hubs. However, due to the large propagation delays, when the MCS selection is received by each of the wireless hubs occurs much later (that is, the channel may have changed) after the selection of the MCS has been made. Accordingly, the base station needs to predict the channel characteristics and a future time and select the MCS for the future time. For an embodiment, the base station predicts the channel characteristics and selects the MCS for wireless communications between the base station and the wireless hubs when the time delay between the base station and the wireless hub(s) is great enough that the communication channel can change substantially (more than a threshold) over a time frame equivalent to a communication delay that includes the propagation delay.

An embodiment includes predicting the characteristics of the communication channel when a communication delay between the base station and the wireless hub is greater than a characteristic time constant of the communication channel. For an embodiment, the characteristic time constant is a minimum period of time between MCS re-selection due to variations of the communication channel over time.

As alluded to, for an embodiment, the communication delay includes the propagation delay. Further, for an embodiment, the communication delay includes the propagation delay and a scheduling delay. For an embodiment, the communication delay is the time duration between MCS selection (or when packet is scheduled) and the time when packet is received by the base station for uplink wireless communication or received by the wireless hub for downlink wireless communication. It is to be understood that the MCS selection based on predicted channel is applicable for both uplink and downlink transmissions.

At least some embodiments include predicting the characteristics of the communication channel when a communication delay between the base station and the wireless hub is greater than a characteristic time constant of a channel evolution with sufficient change to require a new MCS selection, wherein the channel evolution is a variation of the communication channel over time. For an embodiment, the characteristic time constant is a mean of a distribution of threshold MCS reselection times, where the threshold selection times are a set of time durations that mark the elapsed time between different MCSs being assigned. As previously stated, for an embodiment, the smallest or shortest time elapse between MCSs selections.

At least some embodiments include predicting the characteristics of the communication channel when a communication delay between the base station and the wireless hub is greater than a period of time of a predetermined channel change threshold, wherein the period of time of the predetermined channel change threshold is a selected period of time over which a change in a quality of the communication channel is great enough to require a new MCS selection.

At least some embodiments include determining the communication delay between the base station and the plurality of hubs, wherein the plurality of hubs includes the hub. For an embodiment, determining the communication delay includes determining a maximum communication delay between the base station and each of the plurality of hubs. As described, for an embodiment, the communication delay includes at least the propagation delay between the base station and one or more hubs, and a scheduling delay.

For an embodiment, the base station predicts the channel characteristics when the MaxRTT (maximum round trip time of a plurality of wireless hubs) of the system is greater than a threshold period of change of the communication channel. For example, a wireless hub may be on a rotating mount which rotates at a rate of 1 Hz and has an angular beam width of 90 degrees. Therefore, the communication channel changes over a meaningful threshold (sufficient to switch MCS (for example, 1 dB or more)) every 250 milliseconds. This wireless hub exists amongst a plurality of wireless hubs that communicates with a base station with a fixed MaxRTT of 500 milliseconds. Therefore, the delay in communications (500 milliseconds) is larger than the threshold rate of change of the channel (250 milliseconds) so the base station must predict the channel characteristics.

Figure 2:
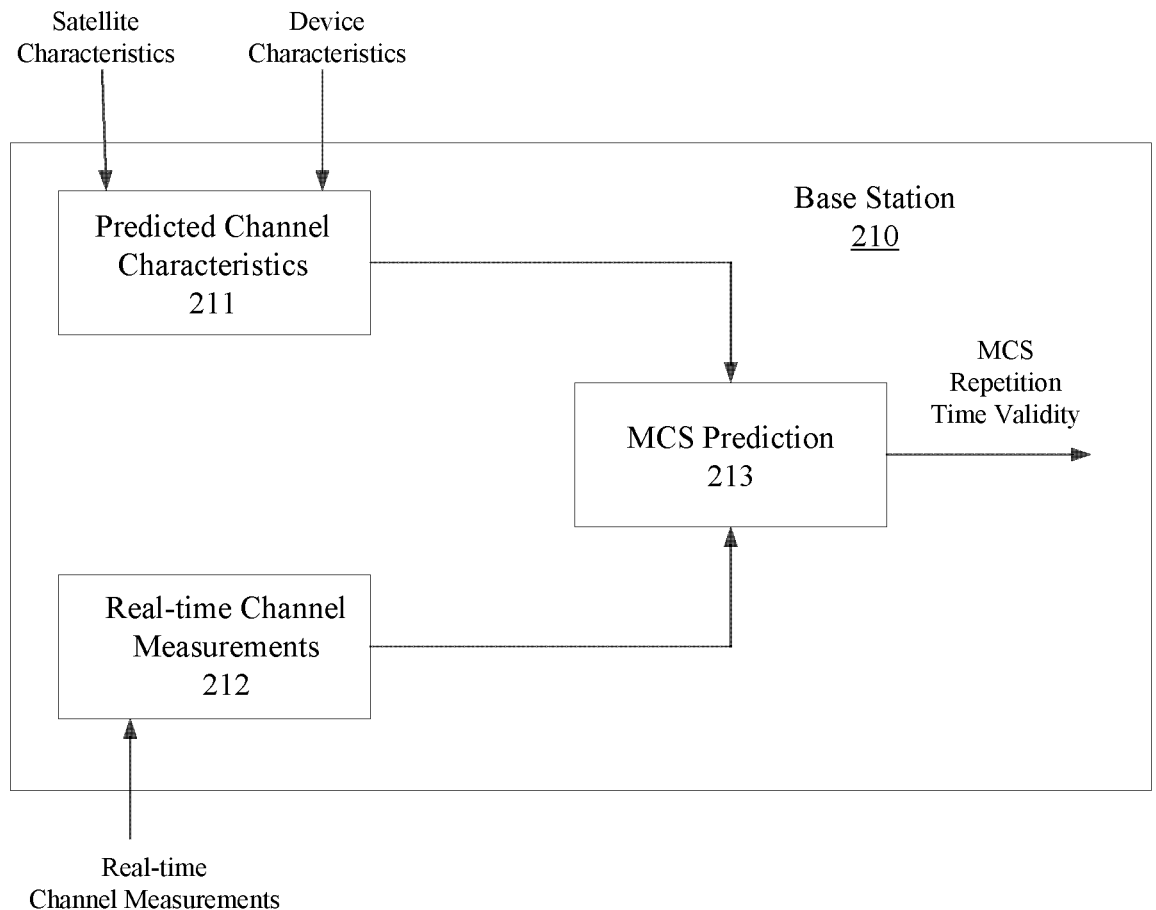
FIG. 2 shows a block diagram of a base station that performs a predictive selection of MCS (modulation and coding scheme) for communication between the base station and a wireless hub, according to an embodiment.

FIG. 2 shows a block diagram of a base station 210 that performs a predictive selection of MCS (modulation and coding scheme) for communication between the base station 210 and a wireless hub, according to an embodiment. As described, the base station 210 selects a predicted MCS for one or more wireless hubs that are wirelessly communicating with the base station 210. For an embodiment, the MCS prediction 213 is made based on predicted channel characteristics 211.

For an embodiment, the predicted channel characteristics 211 include satellite characteristics and device (hub) characteristics. For an embodiment, the satellite characteristics include one or more of measured characteristics including historical measured characteristics and/or aggregated measured characteristics, third party provided characteristics, and/or characteristics provided by the satellite. As previously described, the satellite is constantly in motion which can greatly influence the channel characteristics between the base station and the wireless hubs. Positioning of the satellite can be provided by a third party, or characterized, or both. For an embodiment, the device (hub) characteristics include one or more of measured characteristics including historical measured characteristics and/or aggregated measured characteristics, third party provided characteristics, and/or characteristics provided by the device (hub).

For an embodiment, the base station 210 generates the MCS prediction 213 including the MCS and/or repetition. Further, for an embodiment, the MCS prediction 213 further includes a validity time that indicates how long the MCS/repetition selections are valid. After the time validity, new MCS/repetition selections are needed.

FIG. 3 shows timelines of a predicted channel quality between hubs and a base station, according to an embodiment. A first timeline 310 shows the predicted channel quality based on hub characteristics for a stationary hub and for a non-stationary hub. As shown, the hub characteristics of a stationary hub change very little over time, wherein the hub characteristics of a non-stationary hub may change greatly over time.

A second timeline 320 shows an example of predicted channel quality based on satellite characteristics. As previously described, the satellite is in constant motion. Therefore, the impact of the satellite on the channel characteristics can be constantly changing. The position and/or motion of the satellite can be determined based on ephemeris information of the satellite. The ephemeris information includes kinematic information of the satellite.

For an embodiment, the kinematic information includes at least an x, y, z location of the satellite, and three orientations of velocity (Vx, Vy, Vz) of the satellite. For an embodiment, the kinematic information is encoded in multiple formats which provides location and/or velocity of the satellite at a specific moment of time. For an embodiment, the format used also conveys the reference frame used or location and velocity encoding. For an embodiment, the kinematic information includes satellite ephemeris data which can be used to calculate location of a satellite at a specific moment of time. For an embodiment, the kinematic information provides high accuracy location information for a limited time duration. Therefore, for an embodiment, the kinematic information is refreshed regularly to provide accurate location of the satellite.

For an embodiment, predicting characteristics of the communication channel, includes estimating the characteristics in a future time based at least in part on a predicted location of the satellite at the future time. As previously described, the positioning of the satellite is constantly changing. Accordingly, the communication channel characteristics between the base station and the wireless hub is constantly changing. Monitoring and predicting the location of the satellite can be used for predicting the channel characteristics, and therefore, aid in the MCS and/or repetition selections.

For an embodiment, predicting characteristics of the communication channel at a future time based at least on an elevation angle between the wireless hub and the satellite. For an embodiment, the elevation angle is an angle of a line-of-sight direction from the wireless hub to the satellite relative to a ground surface of the wireless hub. For an embodiment, the elevation angle provides an indication of how much of a wireless link (such as, distance or time) of the elevation angle travels within a medium of an atmosphere in which the wireless hub is located. The steeper (greater) the elevation angel, generally the shorter the distance and time in which the wireless communication signals of the wireless link travel within the atmosphere. Accordingly, such factors, such as, rain or snow may have a greater impact on the wireless communication link when the elevation angle is low, and therefore, the distance traveled and the time traveled by the wireless signals of the wireless communication link through the snow or rain. Further, with a lower elevation angle, the probability of the communication channel being impeded by a barrier (occlusion) is greater.

At least some embodiments, further include estimating at least one of an atmospheric path loss, a thermal noise, or a phase noise based on the predicted elevation angle or a velocity of the satellite. As described, the elevation angle provides an indication of the wireless communication path of the communication channel through the atmosphere in which the wireless hub is located. Therefore, characteristics of the atmosphere, such as, path loss due to weather and temperature are directly influenced by the elevation angle.

For an embodiment, 3rd party non-direct channel characteristic forecast is based on tracking the ephemeris of the satellite. Further, the channel characteristics can be predicted based on predicting the elevation angle between a wireless hub and the satellite, and estimating an atmospheric path loss, thermal noise, and phase noise based on that forecasted elevation angle.

For an embodiment, estimating the characteristics in the future time further based on predicted atmospheric weather conditions. For at least some embodiments, the predicted weather conditions include one or more of temperature, moisture (rain or snow), and other weather conditions. For an embodiment, the temperature includes, for example, the daytime temperature is different from the nighttime temperature range. Other weather conditions include season, temperature prediction, and/or storm information.

At least some embodiment further account for the impact of orbital motion of the satellite in predicting the channel characteristics. For at least some embodiments, geo-synchronous satellites are not exactly geo-stationary. Satellites have slight inclination and the propagation delay between satellite and hub/base station changes with time. Due to the satellite motion, satellite beam can have different performance (SINR (signal interference to noise ratio)/RSSI (receive signal strength indicator)) at different times of the day. These variations impact the predicted satellite characteristics. That is, the satellite motion and impacts focusing and defocusing of the satellite beam at a beam target, such as, a wireless hub.

For an embodiment, estimating the characteristics in the future time further based aggregated observations of communication channel over time. For an embodiment, when a base station predicts channel characteristics, the base station is estimating the channel not based on real time observations (as is typically the case), but historic, often aggregated observations, and augmented with 3rd party (non-direct observations or forecasts) such as satellite location (ephemeris information), type of application of device, atmospheric weather conditions, etc.

For an embodiment, a 3rd party non-direct channel characteristic forecast includes reporting the host asset (what is the piece of equipment the wireless hub is connected to, such as, for example, on a tractor, your wrist, a car, etc.) of the wireless hub and its associated usage profile. For example, it may be communicated that a wireless hub is on a buoy in the ocean and subject to regular angular rotation from waves, therefore when predicting an MCS and more conservative MCS is assigned.

For at least some embodiments, provided 3rd party information used for predicting the channel characteristics includes, for example, an expected location of a wireless hub or the satellite, antenna performance of the wireless hub or the satellite, types of integrated circuits used within the wireless hub of the satellite, manufacturer information of the wireless hub of the satellite, bill plan, device type f the wireless hub of the satellite, data type, QoS requirement, network current capacity, latency expectations. Other provided 3rd party information used for predicting the channel characteristics includes, for example, satellite ephemeris, satellite type, atmosphere, weather, frequency, interference, or frequency reuse plan.

For at least some embodiments, a minimum MCS/repetitions recommendations/recommendation are based on required or desired latency, QoS (quality of service), and/or a bill plan requirement. For example, some low bill plan devices or low quality of service devices may be allowed in the network only when the channel characteristics or the predicted MCS is above a threshold. For an embodiment, the channel characteristics or the predicted MCS defines a minimum MCS for those devices.

For an embodiment, the base station predicts an MCS assignment based upon a weighted consideration of both predicted channel characteristics and real time observations. For an example, a low earth orbit satellite system has a MAXRTT of 70 ms, which represents a scenario where the threshold period of change of the communication channel is larger than the MAXRTT, in this scenario the base station weighs more heavily the real time measurements to assign an MCS.

For an embodiment, a 3rd party observation includes a reference communication system transmitting signals across the satellite communication channel and reporting on channel characteristics to the base station or wireless hubs. For example, a highly precise transmitting/receiver can perform doppler measurements that are to report to the base station and/or the wireless hub(s).

FIG. 4 shows a timeline 401 of a channel quality, and a timeline 402 of characteristic time constants of a channel, according to an embodiment. A curve 410 of timeline 410 shows an example of a channel quality over time of a wireless channel link that includes a satellite. As shown, the channel quality varies, and may have an at least semi-periodic quality. As shown, different channel qualities drive different MCS selections. As shown, the MCS selections vary according to the current channel quality. Further, as shown, time periods T1, T2, T3, T4, T5, T6, T7 vary as the rate in which the channel quality varies.

As shown, exemplary time periods T2, T6 are the smallest or the shortest because these time periods correspond with the times in which the channel quality is changing at the fastest rate and is reflected in the rate in which new MCS selections are made. The timeline 402 shows the duration of the different periods for the different MCS selections. That is, the timeline 402 shows the characteristic time constant for the MCS selections of the base station over time. As shown, the characteristic time constants T2 or T6 may be identified as having the shortest time duration, wherein T2=t2−t1.

As previously stated, for an embodiment, the base station is configured to predict the characteristics of the communication channel when a communication delay between the base station and the wireless hub is greater than a characteristic time constant of the communication channel, wherein the characteristic time constant is a minimum period of time between MCS re-selection due to variations of the communication channel over time. That is, when the communication delay between the base station and the wireless hub is greater than the characteristic time constant of the communication channel then the quality of the communication channel is changing so fast that the MSC selection needs to account for the communication delay. More specifically, the base station must forecast what the MCS selection will need to be based on a prediction of the quality of the communication channel at a future time.

Figure 5:
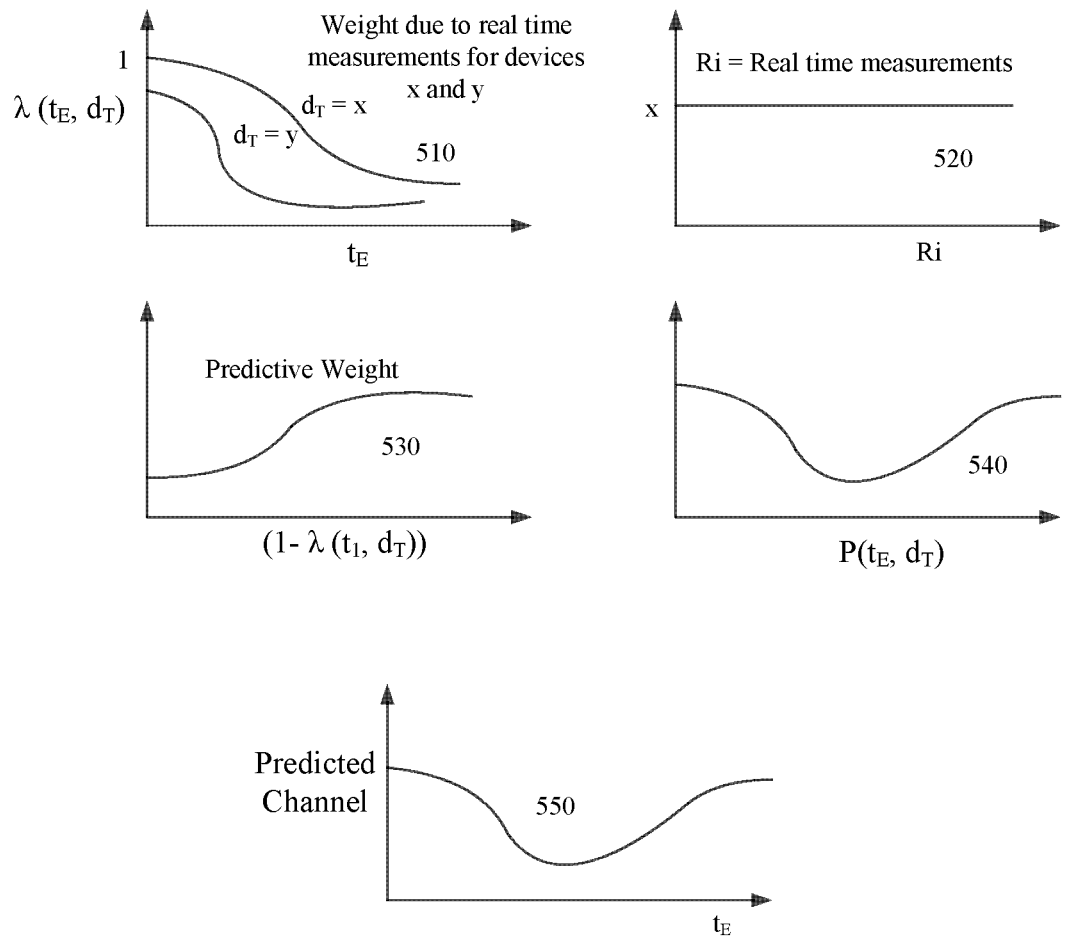
FIG. 5 shows plots of parameters that contribute to the prediction of the characteristics of a communication channel between a base station and a wireless hub, according to an embodiment.

FIG. 5 shows plots of parameters that contribute to the prediction of the characteristics of a communication channel between a base station and a wireless hub, according to an embodiment. As shown, for an embodiment, the predicted characteristics of the communication channel that can be used for MCS selection includes a weighted combination of measured channel characteristics and predicted channel characteristics. That is, as shown, the predicated channel characteristics can be determined by:

Predicted channel characteristic $(PCC)=\lambda(t_E, d_t)R_t+(1-\lambda(t_1, d_T))P(t_E, d_T)$, wherein $\lambda(t_E, d_t)$ is the weighted contribution of the measured characteristic $(R_t)$ as a function of time elapsed $(t_E)$ and device type $(d_t)$, and $(1-\lambda(t_1, d_T))$ is the weighted contribution of the predicted channel characteristics $(P(t_E, d_T))$ as a function of a current time $(t_1)$ and device type $(d_t)$. The elapsed time is the difference between the present time $(t_1)$ and an initial time $(t_i)$.

Curves 510 show exemplary characteristics the weighting of the measured characteristics for two device types x and y. Curve 520 shows an example of the real time measurements over time. Curve 530 shows an example of the weighting of the predictive component of the channel characteristics. Curve 540 shows an example of the predictive channel characteristics. Finally, curve 550 shows an example of the predicted channel characteristics for MCS selection by a base station.

FIG. 6 shows steps of a method of method of adaptive satellite wireless communication parameter selections, according to an embodiment. A first step 610 includes predicting, by a base station, characteristics of a communication channel between the base station and a wireless hub, wherein a satellite is located within the communication channel between the base station and the wireless hub. A second step 520 includes selecting, by the base station, wireless communication parameter selections including at least an MCS (modulation and coding scheme) based on the predicted characteristics of the communication channel.

As previously described, for an embodiment, predicting the characteristics of the communication channel when a communication delay between the base station and the wireless hub is greater than a characteristic time constant of the communication channel, wherein the characteristic time constant is a minimum period of time between MCS re-selection due to variations of the communication channel over time.

As alluded to, for an embodiment, the communication delay includes the propagation delay. Further, for an embodiment, the communication delay includes the propagation delay and a scheduling delay. For an embodiment, the communication delay is the time duration between MCS selection (or when packet is scheduled) and the time when packet is received by the base station for uplink wireless communication or received by the wireless hub for downlink wireless communication. It is to be understood that the MCS selection based on predicted channel is applicable for both uplink and downlink transmissions.

As previously described, for an embodiment, predicting the characteristics of the communication channel when a communication delay between the base station and the wireless hub is greater than a characteristic time constant of a channel evolution with sufficient change to require a new MCS selection, wherein the channel evolution is a variation of the communication channel over time. For an embodiment, where the characteristic time constant is a mean of a distribution of threshold MCS reselection times, where the threshold selection times are a set of time durations that mark the elapsed time between different MCSs being assigned.

As previously described, for an embodiment, predicting the characteristics of the communication channel when a communication delay between the base station and the wireless hub is greater than a period of time of a predetermined channel change threshold, wherein the period of time of the predetermined channel change threshold is a selected period of time over which a change in a quality of the communication channel is great enough to require a new MCS selection.

As previously described, for at least some embodiments include determining the communication delay between the base station and the plurality of hubs, wherein the plurality of hubs includes the hub. For an embodiment, determining the communication delay includes determining a maximum communication delay between the base station and each of the plurality of hubs. As described, for an embodiment, the communication delay includes at least the propagation delay between the base station and one or more hubs, and a scheduling delay.

As previously described, for an embodiment, the base station predicts the channel characteristics when the MaxRTT (maximum round trip time of a plurality of wireless hubs) of the system is greater than a threshold period of change of the communication channel. For example, a wireless hub may be on a rotating mount which rotates at a rate of 1 Hz and has an angular beam width of 90 degrees. Therefore, the communication channel changes over a meaningful threshold (sufficient to switch MCS (for example, 1 dB or more)) every 250 milliseconds. This wireless hub exists amongst a plurality of wireless hubs that communicates with a base station with a fixed MaxRTT of 500 milliseconds. Therefore, the delay in communications (500 milliseconds) is larger than the threshold rate of change of the channel (250 milliseconds) so the base station must predict the channel characteristics.

As previously described, for an embodiment, predicting characteristics of the communication channel, comprises estimating the characteristics in a future time based at least in part on a predicted location of the satellite at the future time. For an embodiment, predicting characteristics of the communication channel at a future time based at least on an elevation angle between the wireless hub and the satellite.

At least some embodiments further include predicting characteristics of the communication channel at a future time based on estimations of at least one of an atmospheric path loss, a thermal noise, or a phase noise based on the predicted elevation angle or a velocity of the satellite. For an embodiment, a 3rd party non-direct channel characteristic forecast tracks the ephemeris of the satellite and predicts the elevation angle between a wireless hub and the satellite. The atmospheric path loss, thermal noise, and phase noise can be estimated based on the forecasted elevation angle, which is used to help predict an MSC assignment.

For an embodiment, estimating the characteristics in the future time further based on aggregated observations of communication channel over time. For an embodiment, when a base station predicts channel characteristics, the base station is estimating the channel not based on real time observations (as is typically the case), but historic, often aggregated observations, and augmented with 3rd party (non-direct observations or forecasts) such as satellite location (ephemeris information), type of application of device, atmospheric weather conditions, etc.

For an embodiment, a 3rd party non-direct channel characteristic forecast includes reporting the host asset (what is the piece of equipment the wireless hub is connected to, such as, for example, on a tractor, your wrist, a car, etc.) of the wireless hub and its associated usage profile. For example, it may be communicated that a wireless hub is on a buoy in the ocean and subject to regular angular rotation from waves, therefore when predicting an MCS and more conservative MCS is assigned.

For an embodiment, the base station predicts and selects an MCS assignment based on a weighted consideration of both predicted channel characteristics and real time observations. For example, a low earth orbit satellite system has a MAXRTT of 70 ms, which represents a scenario where the threshold period of change of the communication channel is larger than the MAXRTT. For an embodiment, in this situation, the base station puts more weight on the predicted channel characteristics than the real time measurements to assign an MCS.

For an embodiment, a 3rd party observation includes a reference communication system transmitting signals across the satellite communication channel and reporting on channel characteristics to the base station or wireless hubs. For example, the reference communication system may include a highly precise transmitting/receiver performing doppler measurements to report to the base station and/or the hubs.

As previously described, for an embodiment, the base station further selects a packet repetition based on the predicted characteristics of the communication channel. As previously described, the MCS can include the repetition. For an embodiment, the MCS may only include packet repetition, or the base station may only predictively select the packet repetition. For example, if the channel characteristics indicate that the communication channel will be poor, then the base station may selection to either or both, decrease MCS or add repetitions. Further, if the channel characteristics indicated that the communication channel will be good, then the base station may select to either or both, increase MCS or reduce repetitions.

For an embodiment, the base stations can update MCS and repetition for coverage enhancement levels when the change in predicted channel characteristics is greater than a threshold. The Coverage Enhancement [CE] level is a 3GPP defined term. The NB-IoT standard supports three so-called Coverage Enhancement (CE)-Levels. Each CE Level determines the number of times downlink and uplink messages can be repeated to reach devices in poor coverage and the number of repetitions in each CE-Level is predefined by the network. For an embodiment, based on the predicted channel characteristics, the base station can divide hubs into different groups and assign them to different coverage enhancement levels. The MCS and repetition for coverage enhancement levels can then be selected based on the predicted channel characteristics for that particular group of hubs. Further, since predicted channel characteristics change with time, base stations can update MCS and repetition for coverage enhancement levels when the change in predicted channel characteristics is greater than a threshold.

At least some embodiments further include communicating, by the wireless hub, channel characteristic information to the base station, wherein the communicated channel characteristics information includes at least one of measured local signal quality at the wireless hub, or a reference signal for reception by the base station. At least some embodiments further include performing, by the base station, a dynamic classification of the wireless hub based on historical communication channel characteristic information provided by the wireless hub. At least some embodiments further include measuring, by the base station, a received signal quality of the reference signal received at the base station from the wireless hub. At least some embodiments further include selecting, by the base station, the MCS wireless communication parameter selections further based on the channel characteristic information.

At least some embodiments further include receiving, by the base station, a type classification from the wireless hub, and selecting, by the base station the MCS based on the device type classification. For example, the type classification may be mobile device or fixed device. For an embodiment, the type classification includes something that indicates mean and variance channel performance expectations. For example, a mobile device typically is subjected to much more channel variance than a stationary device, and the base station can utilize this information when assigning the predictive MCS to wireless communication between the base station and the hub.

For an embodiment, the selected MCS has a time validity based on the predicted channel characteristics. For an embodiment, the time validity can be based on one or more of the predictive channel [satellite] or a predictive device [device type]). For an example, if MCS is valid for next 5 seconds then, for an embodiment, the base station makes sure that packets scheduled in next 5 secs are using the same MCS and that the MCS is refreshed when the MCS expires. For an embodiment, the MCS validity time is used for scheduling of pre-configured or semi-persistent resources, wherein pre-configured or semi-persistent resources represent packets scheduled in future. For an embodiment, the selected MCS has the time validity based on a device (wireless hub) type classification.

For an embodiment, the time validity is selected to ensure that an expected change in the communication channel is less than a link margin available for a most recently selected MCS. For an embodiment, the validity time is determined such that the expected change in channel during validity time is less than the link margin available with the selected MCS. For example, if the link margin with the selected MCS is 3 dB, then channel degradation should be less than 3 dB during the MCS validity time.

At least some embodiments further include assigning (selecting), by the base station, a range of allowable MCSs, providing the range of allowable MCSs to the wireless hub. For an embodiment, the wireless hub then selects a local MCS based on local measurements and the assigned range of allowable MCSs. For an embodiment, the range of MCSs includes a minimum or do not exceed MCS or repetitions. The minimum or do not exceed MCS or repetitions can be useful for an over-subscription system for MCS allocation.

At least some embodiments further include assigning a priority weighting of the predicted channel performance and the channel characteristic information in the selection of the MCS. For an embodiment, the priority weighting is assigned based on a communication delay time between the base station and the wireless hub. For an embodiment, as the round trip time decreases the channel characteristic information becomes more real time and the predictive nature is not required and the base station makes real time MCS selections, as the round trip time increases the channel characteristic information becomes less real time and the system must rely on predictive information to make predictive MCS selections.

For an embodiment, the priority weighting is assigned based on a device type classification of the wireless hub.

At least some embodiments further include selecting the MCS based on a per packet segment basis. For an embodiment, the MCS is assigned on a per packet basis, when operating at a low MCS, packets are often segmented, wherein each segment is only transmitted after the prior segment has been acknowledged. This can lead to potentially very long (30s+) transmission times, during which the channel could have changed dramatically resulting in the device not having the correct MCS assignment. At least some embodiments further include updating the selected MCS for residual packet segments based on feedback from earlier packet segments. For an embodiment, a packet may be split in multiple (such as, 10) segments, every 1 second the wireless hub sends a segment to the base station. Each segment that the base station receives provides channel characteristic information to the base station, the base station can use this information to update the MCS selection for the remaining packets to ensure the link is robust and efficient.

At least some embodiments further include updating, by the base station, the predictive satellite channel characteristics based on the (en masse) channel characteristic information from a multitude of wireless hubs. For an embodiment, a plurality of hubs report their communication delay times between themselves and the satellite. This delay information is used to triangulate the location of the satellite and provide a more accurate set of ephemeris information on the position of the satellite.

For an embodiment, a plurality of hubs provides channel performance metrics (for example, SINR (signal to interference, noise ratio) and/or RSSI (received signal strength indicator) which can be used to predict the satellite channel characteristics at different times due to the motion of the satellite. Aggregating the performance metrics over time aids in predicting the future channel characteristics. For example, the cyclic nature of the geostationary satellite performance can be predicted by aggregating measurements over time.

Figure 7:
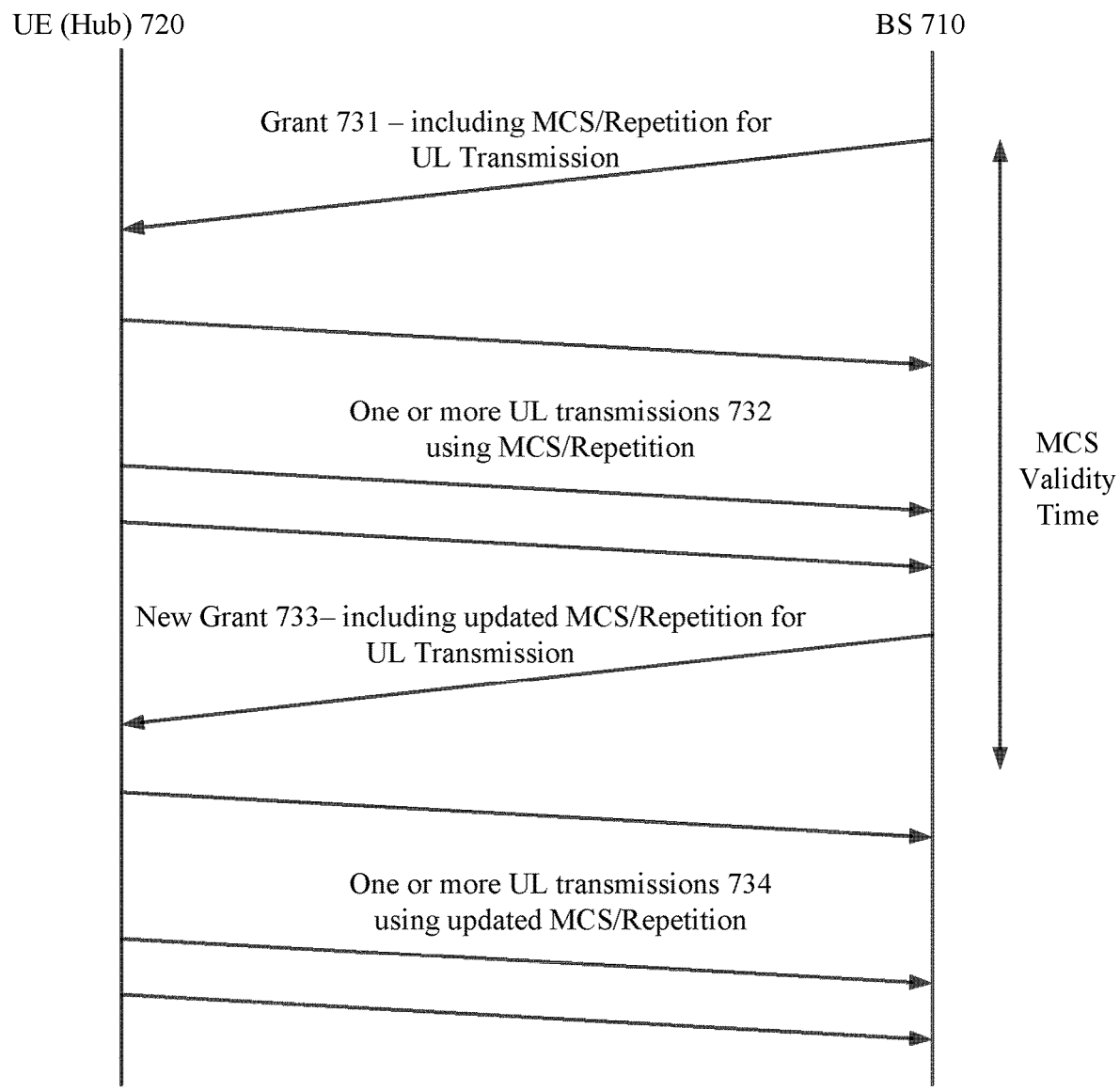
FIG. 7 shows a sequence of events for supporting uplink wireless communications, according to an embodiment.

FIG. 7 shows a sequence of events for supporting uplink wireless communications, according to an embodiment. The BS (base station) 710 transmits a grant 731 to the hub 720 that includes a predicted MCS/repetition selection for uplink transmission from the hub 720 to the base station 710. The hub 720 responds by transmitting one or more uplink transmission 732 to the base station using the predicted MCS/repetition selection. After an MCS validity time, the base station selects and transmits a new grant 733 with a new predicted MCS/repetition selection. The hub 720 then transmits one or more uplink transmission 734 with the new or updated MCS/repetition selections.

Figure 8:
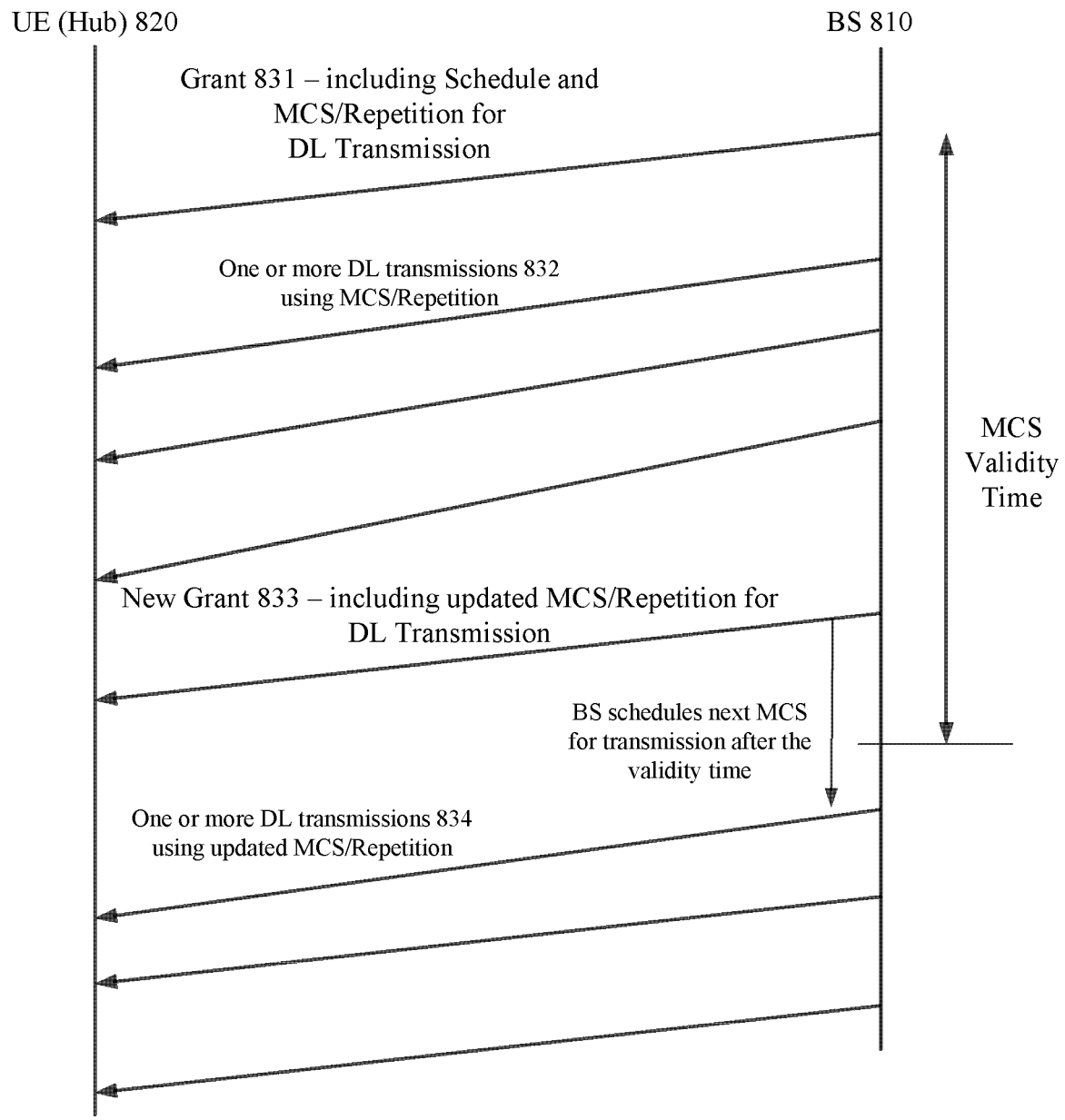
FIG. 8 shows a sequence of events for supporting downlink wireless communications, according to an embodiment.

FIG. 8 shows a sequence of events for supporting downlink wireless communications, according to an embodiment. The BS (base station) 810 transmits a grant 831 to the hub 820 that includes a predicted MCS/repetition selection for downlink transmission from the base station 810 to the hub 820. The base station 810 then transmits one or more downlink transmission 832 to the hub 820 using the predicted MCS/repetition selection. After an MCS validity time, the base station selects and transmits a new grant 833 with a new predicted MCS/repetition selection. The base station 810 then transmits one or more downlink transmission 834 with the new or updated MCS/repetition selections.

Although specific embodiments have been described and illustrated, the embodiments are not to be limited to the specific forms or arrangements of parts so described and illustrated. The described embodiments are to only be limited by the claims.

What is claimed:

1. A method of adaptive satellite wireless communication parameter selections, comprising:
    predicting, by a base station, characteristics of a communication channel between the base station and a wireless hub, wherein a satellite is located within the communication channel between the base station and the wireless hub when a communication delay between the base station and the wireless hub is greater than a characteristic time constant of a channel evolution with sufficient change to require a new MCS selection, wherein the channel evolution is a variation of the communication channel over time; and
    selecting, by the base station, wireless communication parameter selections including at least an MCS (modulation and coding scheme) based on the predicted characteristics of the communication channel.

2. The method of claim 1, further comprising determining the communication delay between the base station and a plurality of hubs, comprising determining a maximum communication delay between the base station and each of the plurality of hubs.

3. The method of claim 1, wherein predicting characteristics of the communication channel, comprises estimating the characteristics in a future time based at least in part on a predicted location of the satellite at the future time.

4. The method of claim 3, further comprising predicting characteristics of the communication channel at a future time based at least on an elevation angle between the wireless hub and the satellite.

5. The method of claim 4, further comprising predicting characteristics of the communication channel at a future time based on estimations of at least one of an atmospheric path loss, a thermal noise, or a phase noise based on a predicted elevation angle or a velocity of the satellite.

6. The method of claim 3, wherein estimating the characteristics in the future time further based on aggregated observations of communication channel over time.

7. The method of claim 1, wherein the base station further selects a packet repetition based on the predicted characteristics of the communication channel.

8. A method of adaptive satellite wireless communication parameter selections, comprising:
    predicting, by a base station, characteristics of a communication channel between the base station and a wireless hub, wherein a satellite is located within the communication channel between the base station and the wireless hub; and
    selecting, by the base station, wireless communication parameter selections including at least an MCS (modulation and coding scheme) based on the predicted characteristics of the communication channel;
    wherein the base station further assigns an MCS and repetitions for coverage enhancement levels based on the predicted channel characteristics of a group of hubs with similar channel characteristics for wireless hub random access.

9. The method of claim 1, further comprising;
    receiving, by the base station, a type classification from the wireless hub;
    selecting, by the base station the MCS based on the device type classification.

10. The method of claim 1, wherein the selected MCS has a time validity based on the predicted channel characteristics.

11. The method of claim 10, wherein the time validity is selected to ensure that an expected change in the communication channel is less than a link margin available for a most recently selected MCS.

12. The method of claim 10, wherein the selected MCS has the time validity based on a device type classification.

13. The method of claim 1, further comprising:
    assigning, by the base station, a range of allowable MCSs;
    providing the range of allowable MCSs to the wireless hub; and
    wherein the wireless hub selects a local MCS based on local measurements and the assigned range of allowable MCSs.

14. A method of adaptive satellite wireless communication parameter selections, comprising:
    predicting, by a base station, characteristics of a communication channel between the base station and a wireless hub, wherein a satellite is located within the communication channel between the base station and the wireless hub; and
    selecting, by the base station, wireless communication parameter selections including at least an MCS (modulation and coding scheme) based on the predicted characteristics of the communication channel;
    assigning a priority weighting of the predicted channel performance and the channel characteristic information in the selection of the MCS.

15. The method of claim 14, wherein the priority weighting is assigned based on a communication delay time between the base station and the wireless hub.

16. The method of claim 14, wherein the priority weighting is assigned based on a device type classification of the wireless hub.

17. The method of claim 1, further comprising selecting the MCS based on a per packet segment basis.

18. The method of claim 17, further comprising updating the selected MCS for residual packet segments based on feedback from earlier packet segments.

19. The method of claim 1, further comprising:
    updating, by the base station, the predictive satellite channel characteristics based on the channel characteristic information from a multitude of wireless hubs.

20. The method of claim 1, wherein the base station additionally selects the MCS based on the operating conditions of the satellite or the wireless hub.

21. A satellite wireless communication system, comprising:
- a wireless hub;
- a base station, the base station configured to:
    - predict characteristics of a communication channel between the base station and the wireless hub, wherein a satellite is located within the communication channel between the base station and the wireless hub when a communication delay between the base station and the wireless hub is greater than a characteristic time constant of a channel evolution with sufficient change to require a new MCS selection, wherein the channel evolution is a variation of the communication channel over time; and
    - select wireless communication parameters including at least an MCS (modulation and coding scheme) based on the predicted characteristics of the communication channel.

\* \* \* \* \*